(12) United States Patent
Ahuja et al.

(10) Patent No.: US 10,678,997 B2
(45) Date of Patent: Jun. 9, 2020

(54) MACHINE LEARNED MODELS FOR CONTEXTUAL EDITING OF SOCIAL NETWORKING PROFILES

(71) Applicant: Microsoft Technology Licensing, LLC, Redmond, WA (US)

(72) Inventors: Karan Ashok Ahuja, Palo Alto, CA (US); Befekadu Ayenew Ejigou, San Leandro, CA (US); Ningfeng Liang, Cupertino, CA (US); Lokesh P. Bajaj, Fremont, CA (US); Wei Wang, San Jose, CA (US); Paul Fletcher, Sunnyvale, CA (US); Wei Lu, San Jose, CA (US); Shaunak Chatterjee, Sunnyvale, CA (US); Souvik Ghosh, Saratoga, CA (US); Yang Li, Sunnyvale, CA (US); Wei Deng, San Francisco, CA (US); Qiang Wu, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 116 days.

(21) Appl. No.: 15/825,657

(22) Filed: Nov. 29, 2017

(65) Prior Publication Data
US 2019/0108209 A1 Apr. 11, 2019

Related U.S. Application Data

(60) Provisional application No. 62/568,736, filed on Oct. 5, 2017.

(51) Int. Cl.
*G06F 17/00* (2019.01)
*G06F 40/174* (2020.01)
(Continued)

(52) U.S. Cl.
CPC .......... *G06F 40/174* (2020.01); *G06N 20/00* (2019.01); *G06Q 50/01* (2013.01); *H04L 67/22* (2013.01); *H04L 67/306* (2013.01)

(58) Field of Classification Search
CPC ...... G06F 17/243; G06F 15/18; G06F 40/174; G06Q 50/01; H04L 67/306; H04L 67/22; G06N 20/00
(Continued)

(56) References Cited

U.S. PATENT DOCUMENTS

| | | | |
|---|---|---|---|
| 8,001,056 B2* | 8/2011 | Tesler | G06Q 50/01 705/1.1 |
| 8,812,690 B1* | 8/2014 | Ramesh | G06F 17/30893 705/319 |

(Continued)

*Primary Examiner* — Cesar B Paula
*Assistant Examiner* — David Faber
(74) *Attorney, Agent, or Firm* — Schwegman Lundberg & Woessner, P.A.

(57) ABSTRACT

In an example, first and second machine learned models corresponding to a particular context of a social networking service are obtained, the first machine learned model trained via a first machine learning algorithm to output an indication of importance of a social networking profile field to obtaining results in the particular context, and the second machine learned model trained via a second machine learning algorithm to output a propensity of the user to edit a social networking profile field if requested. One or more missing fields in a social networking profile for the user are identified. For each of one or more of the one or more missing fields, the field and an identification of the user are passed through the first and second machine learned models, and outputs of the first and second machine learned models are combined to identify one or more top missing profile fields.

20 Claims, 9 Drawing Sheets

(51) Int. Cl.
    *G06Q 50/00*         (2012.01)
    *G06N 20/00*         (2019.01)
    *H04L 29/08*         (2006.01)

(58) Field of Classification Search
    USPC ........................................................ 715/224
    See application file for complete search history.

(56) References Cited

U.S. PATENT DOCUMENTS

| | | | |
|---|---|---|---|
| 8,825,785 B1* | 9/2014 | Shah | G06Q 10/107 |
| | | | 709/206 |
| 9,245,230 B2* | 1/2016 | Pinckney | G06Q 30/02 |
| 9,275,132 B2* | 3/2016 | Roberts | G06F 16/338 |
| 9,569,735 B1* | 2/2017 | Zhu | G06N 99/005 |
| 2007/0011224 A1* | 1/2007 | Mena | G06Q 30/02 |
| | | | 709/200 |
| 2015/0066567 A1* | 3/2015 | Shami | G06Q 10/06315 |
| | | | 705/7.25 |
| 2015/0278836 A1* | 10/2015 | Liu | G06Q 30/0204 |
| | | | 705/7.33 |
| 2017/0063740 A1* | 3/2017 | Schissel | H04L 51/046 |
| 2017/0091692 A1* | 3/2017 | Guo | G06F 16/58 |
| 2017/0185602 A1* | 6/2017 | Gusev | G06N 7/005 |
| 2018/0374105 A1* | 12/2018 | Azout | G06N 20/00 |
| 2019/0050813 A1* | 2/2019 | Guo | G06Q 10/1053 |
| 2019/0074082 A1* | 3/2019 | Buckler | G06F 17/2785 |
| 2019/0095946 A1* | 3/2019 | Azout | G06N 20/00 |
| 2019/0130037 A1* | 5/2019 | Guo | G06F 16/9536 |

\* cited by examiner

MACHINE LEARNED MODELS FOR CONTEXTUAL EDITING OF SOCIAL NETWORKING PROFILES

CROSS-REFERENCE TO RELATED APPLICATIONS

This application claims the benefit of U.S. Provisional Application No. 62/568,736, filed Oct. 5, 2017, entitled "MACHINE LEARNED MODELS FOR CONTEXTUAL EDITING OF SOCIAL NETWORKING PROFILES," which is incorporated herein by reference in its entirety.

TECHNICAL FIELD

The present disclosure generally relates to computer technology for solving technical challenges in machine learning. More specifically, the present disclosure relates to machine learned models for contextual editing of social networking profiles.

BACKGROUND

In various types of social networks, there may be a need to collect, maintain, and utilize profile data. Profile data is information that is contained within, or otherwise associated with, a user's member profile in a social networking system. Examples of common profile data include name, job, industry, location, education, skills, etc.

Typically, profile data is collected first when a user originally signs up with the social networking service. Unfortunately, many users do not complete all of their member profile at that time. Oftentimes at least some profile data is left blank, either because the user intends to complete it at a later date or the user simply does not wish to provide the information at that time. Lack of complete profile data, however, can impair how the social networking system operates at the technical level.

For example, a social networking service may utilize profile data about a user who is performing a search on the social network in order to retrieve and/or rank search results. If the searcher's profile data is lacking, then the retrieved results and/or rankings are likely to be in accurate, or at least not optimally accurate.

Efforts to encourage users to complete additional profile data have been hampered due to user resistance to interruption during online activities. Even when providing the additional profile data would be in the user's own best interests, users are often reluctant to stop their online activities to add the additional information. While users may be more likely to provide additional profile data if it would result in immediate benefits (e.g., immediately improving the online activity they are performing at the moment), from a technical standpoint it is difficult to distinguish times when providing additional profile data would actually improve the immediate online activity and to communicate this effectively to the user.

BRIEF DESCRIPTION OF THE DRAWINGS

Some embodiments of the technology are illustrated, by way of example and not limitation, in the figures of the accompanying drawings.

DETAILED DESCRIPTION

Figure 1:
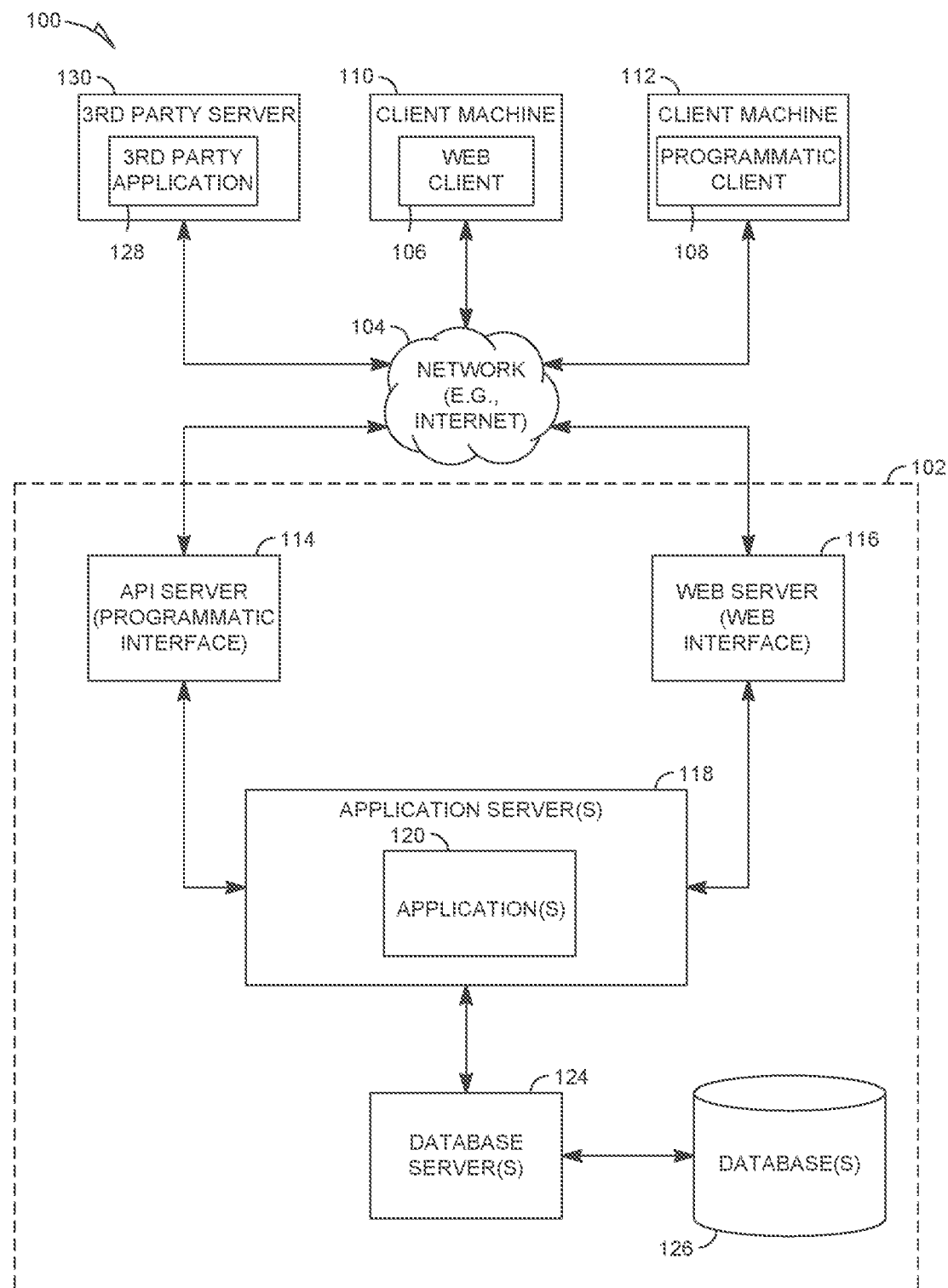
FIG. 1 is a block diagram illustrating a client-server system, in accordance with an example embodiment.

The present disclosure describes, among other things, methods, systems, and computer program products. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a current social networking context is determined. A social networking context is an online activity the user is performing in a social networking service, and may relate, for example, to one of various social networking service operations available to the user. In some example embodiments, the context is determined based on the last performed operation initiated by the user. For example, the user may perform an action that results in a "People You May Know" page that surfaces a list of potential connections for the user. The context in this instance may be the "People You May Know" functionality.

Based on the context, it may first be determined whether the user is having a positive experience in the context. This may be performed by identifying one or more metrics of positivity of the context experience and calculating these metrics to see if they transgress one or more thresholds. For example, if the People You May Know page surfaces a number of potential connections that is less than a predetermined threshold, it may be determined that the user is not having a positive experience in the People You May Know context. In another example embodiment, a first machine learned model is utilized to determine positivity of the context experience for the user. This first machine learned model will be described in more detail below.

If it is determined that the user is not having a positive experience, then a second machine learned model may be used to determine which types of missing profile data, if provided, are likely to improve context experience for this context. A third machine learned model then determines the propensity that the user will provide additional relevant profile data if prompted. Based on the outputs of the second and third machine learned models, the system may decide to surface a request to the user to add the additional profile data. This request may include specifics on how the additional data could improve the context experience. For example, if, in the case above, the user is not being presented with enough potential connections on the "People You May Know" page, and it is determined that the user providing education profile data would most improve the search results, then the request may include an indication that providing the education profile data will likely provide additional relevant potential connections.

The first, second, and third machine learned models may be context-specific, in that each potential context may have its own version of the first and second machine learned models, to further improve technical accuracy. The result is that operations in the social networking service are more accurate as users are prompted to complete additional profile information in contexts and situations within those contexts that are the most meaningful and the most likely to result in the user providing profile data.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
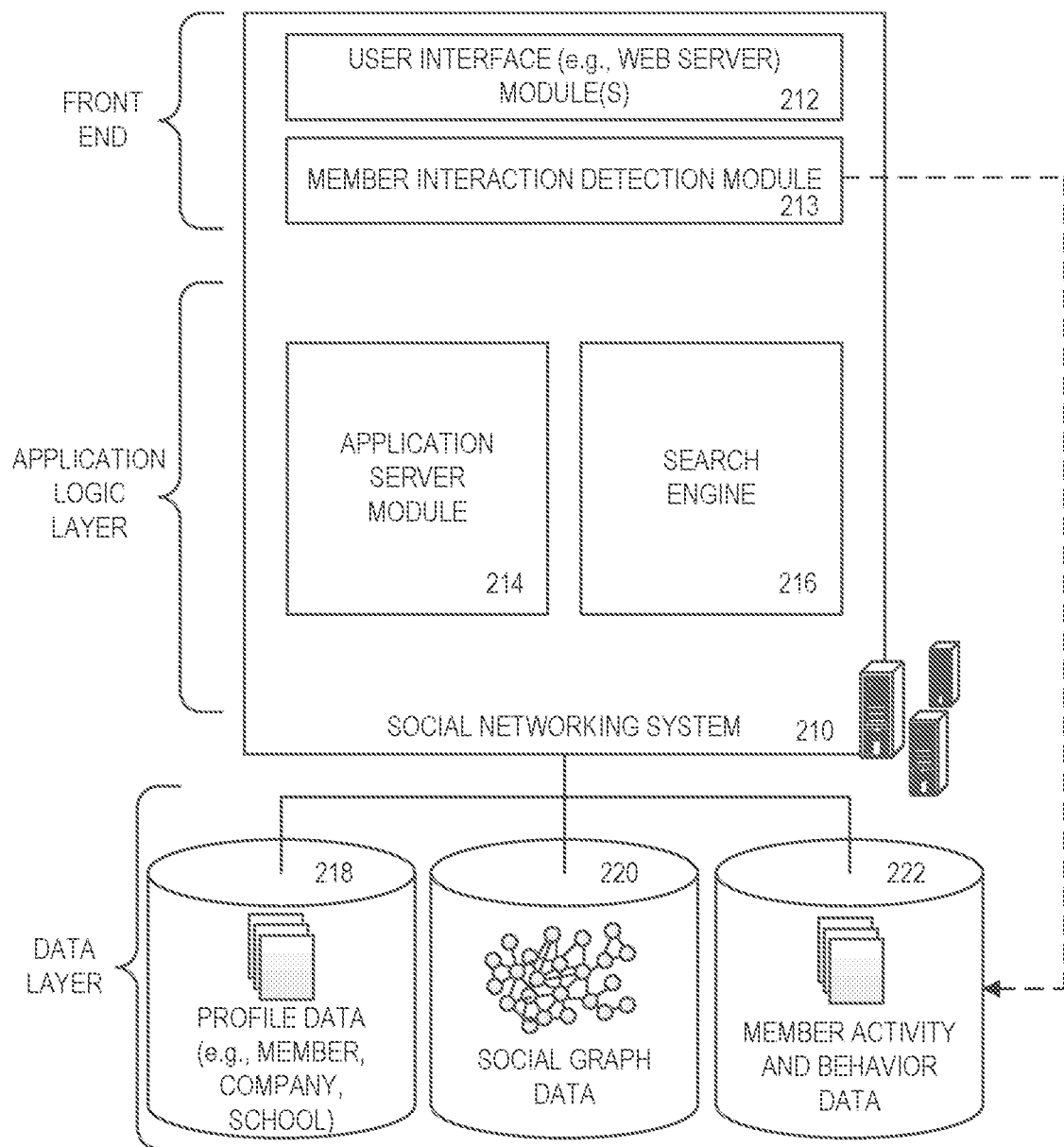
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
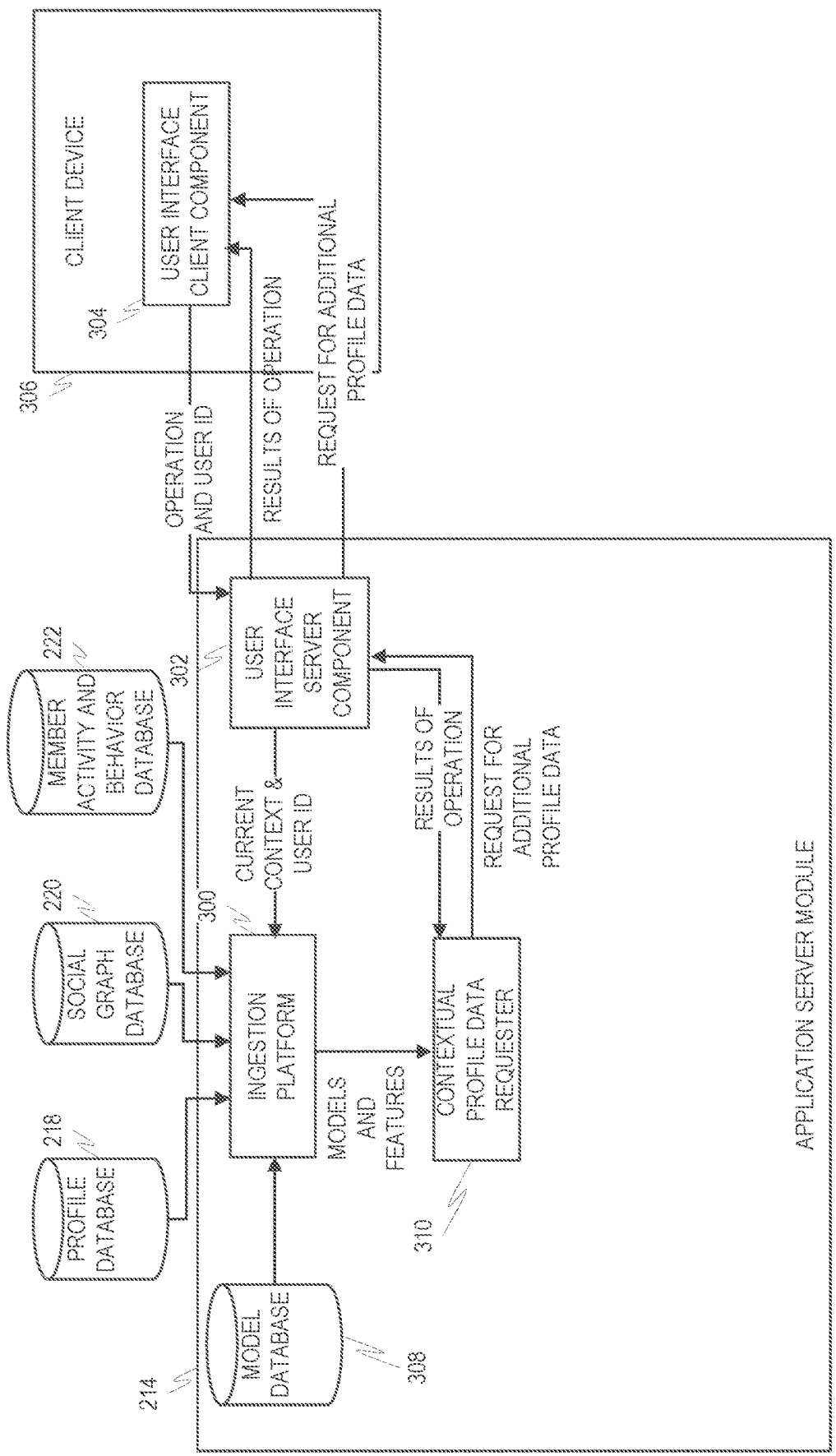
FIG. 3 is a block diagram illustrating an application server module of FIG. 2 in more detail.

FIG. 3 is a block diagram illustrating an application server module 214 of FIG. 2 in more detail. While in many embodiments the application server module 214 will contain many subcomponents used to perform various different actions within the social networking system 210, in FIG. 3 only those components that are relevant to the present disclosure are depicted. Here, an ingestion platform 300 obtains information from the profile database 218, the social graph database 220, and the member activity and behavior database 222 relevant to a current context and user identification as communicated from a user interface server component 302. The user interface server component 302 receives this information from a user interface client component 304 located on a client device 306. The details of the user interface client component 304 are beyond the scope of this disclosure, but generally a user of the user interface client component 304 may be identified by the user interface client component 304 (such as, for example, by the user "logging in" to a social networking service with credential information) and the user may perform some operation. The operation and user ID may be communicated to the user interface server component 302, which may execute some result based on the operation and the current context. The context may, for example, be tracked by the user interface server component 302 and each operation by the user may potentially change the current context. The user interface server component 302 then generates results of the operation and presents them to the user interface client component 304.

Of course, the results of the operation may not be sufficient to provide a positive experience to the user if the user has not provided certain relevant aspects of the profile data. In order to determine whether the user has provided certain relevant aspects of the profile data, and potentially remedy this if not, the user interface server component 302 sends the current context and user identification to the ingestion platform 300. The ingestion platform 300 uses the current context to determine appropriate machine learned models for the context. In some example embodiments this may include selecting a first, second, and/or third machine learned model from a model database 308. The model database 308 may also indicate relevant features for each of the machine learned models. The ingestion platform 300 then uses these indicated relevant features and user identification to retrieve relevant data for the user from the profile database 218, social graph database 220, and/or member activity and behavior database 222. The details of the features and the corresponding relevant data will be described in more detail below.

The ingestion platform 300 may compute the relevant features based on the retrieved data from the profile database 218, social graph database 220, and/or member activity and behavior database 222, and then communicate the relevant models and corresponding relevant features to contextual profile data requester 310. The contextual profile data requester 310 may then determine whether to send a request for additional profile data (and what profile data to request) using the relevant models, corresponding relevant features, and the results of the operation from the user interface server component 302, and then send such a request for additional profile data, if appropriate, to the user interface server component 302.

The user interface server component 302 then sends the request for additional profile data to the user interface client component 304 for display to the user, who may then provide the additional profile data and improve subsequent results of the operation.

Figure 4:
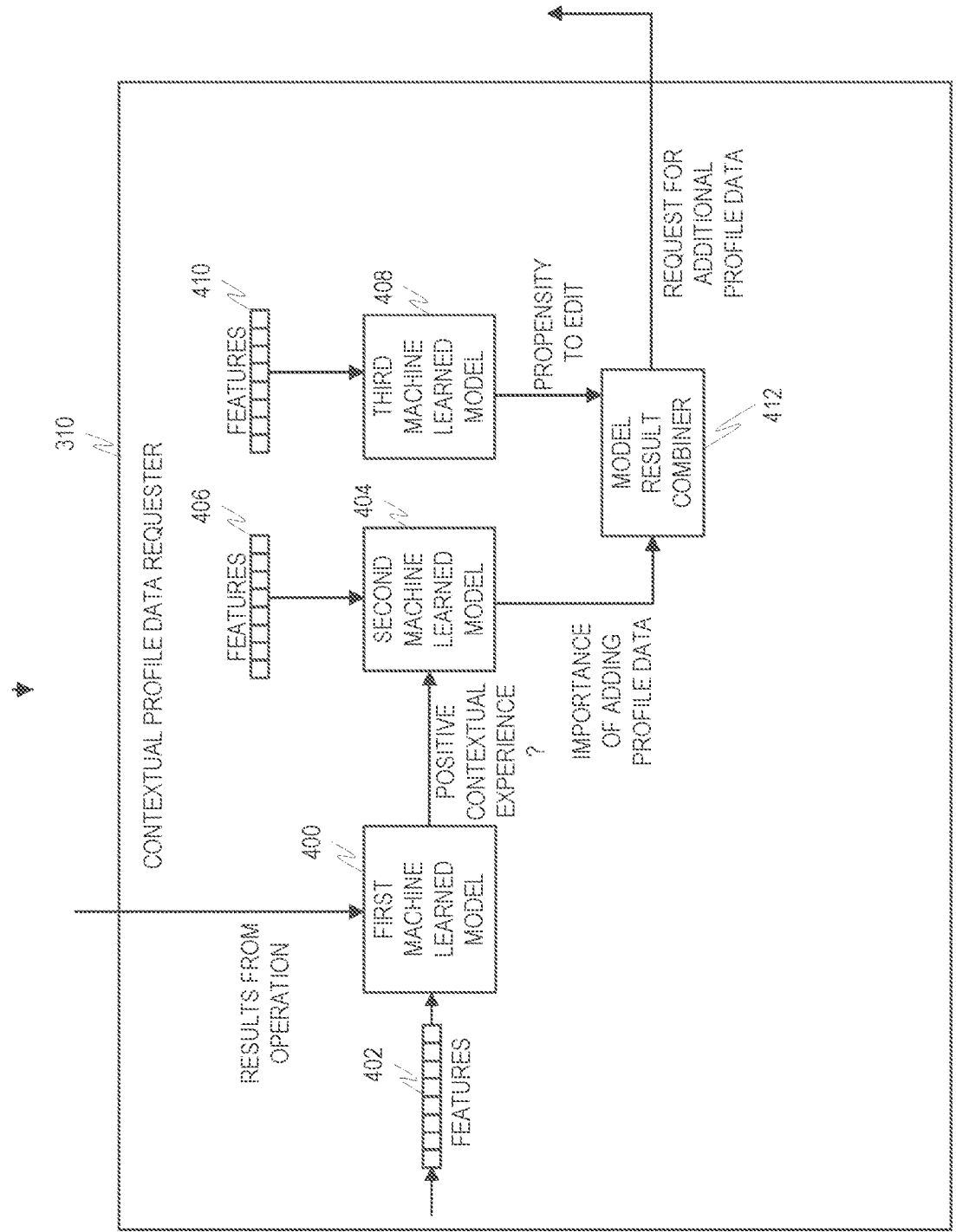
FIG. 4 is a block diagram illustrating the contextual profile data requester of FIG. 3 in more detail, in accordance with an example embodiment.

FIG. 4 is a block diagram illustrating the contextual profile data requester 310 of FIG. 3 in more detail, in accordance with an example embodiment. Here an example where three machine learned models for the context is provided; however, in some example embodiments, fewer machine learned models may be used, and/or some of the machine learned models may be substituted with rule engines applying fixed rules.

The first machine learned model 400 uses features 402 to determine whether or not the results from the operation have provided a positive contextual experience for the user. If so, then no further action from the contextual profile data requester 310 need be taken. If not, however, then the second machine learned model 404 uses features 406 to determine the importance of adding profile data in improving contextual experience for one or more potential pieces of profile data. In some example embodiments this may include determining which pieces of profile data are missing from the member profile and generating a score indicating how much the contextual information would improve if the corresponding missing piece of profile data were provided.

A third machine learned model 408 uses features 410 to determine a propensity that the user will edit the member profile. In some example embodiments, this may also be performed on a piece-of-profile-data basis, in that there may be a different propensity to edit a score provided for each different piece of missing profile data (reflecting the possibility that, for example, the user may be more likely to add education information than skill information.

A model result combiner 412 then combines the results from the second machine learned model 404 and third machine learned model 408 to determine which, if any, pieces of missing profile data to request. A request for the additional profile data, if appropriate, may then be generated and sent to the user interface server component 302 for sending to the user interface client component 304.

The first, second, and third machine learning algorithms may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, other tree models, and hidden Markov models. Examples of unsupervised learning algorithms include expectation-maximization algorithms, vector quantization, and information bottleneck method. In an example embodiment, a binary logistical regression model is used. Binary logistic regression deals with situations in which the observed outcome for a dependent variable can have only two possible types. Logistic regression is used to predict the odds of one case or the other being true based on values of independent variables (predictors). In an example embodiment, the machine learning algorithm(s) may be probabilistic.

The features 402 relevant to the first machine learned model 400, which is determining whether or not the user is having a positive contextual experience, may include features extracted from profile data of the user, such as location, education, industry, company, past experience, interests, skills, to the extent that such profile data is not missing. Relevant metrics that can be computed based on this information may include, for example, years of experience, company or industry transitions, years of education, etc.

The features 402 may also include features extracted from the social graph of the user, including links to other users in the social networking service. Relevant metrics that can be computed based on this information may include number of overall connections, quality of connections, amount of influence of the user based on the connections, social network distance, etc.

The features 402 may also include features extracted from member activity and behavior of the user in the social networking service. This may include, for example, past history of providing additional profile data in response to requests, click activity within various portions of the social networking service, linger time on various portions of the social networking service, etc.

The features 406 relevant to the second machine learned model 404, which is determining the importance of adding profile data, may include features extracted from profile data of the user, such as location, education, industry, company, past experience, interests, skills, to the extent that such data is not missing. Relevant metrics that can be computed based on this information may include, for example, years of experience The features 406 may also include features extracted from the social graph of the user, including links to other users in the social networking service. Relevant metrics that can be computed based on this information may include number of overall connections, quality of connections, amount of influence of the user based on the connections, social network distance, etc.

The features 406 may also include features extracted from member activity and behavior of the user in the social networking service. This may include, for example, past history of providing additional profile data in response to requests, click activity within various portions of the social networking service, linger time on various portions of the social networking service, etc.

In one example embodiment, the features 406 include member network size, including total connection count and recent connection count (e.g., over the last 30 days), the user's recent feed, job search, and/or messaging activity level on the social networking service, the user's tenure on the social networking service, the user's profile completion score, which represents how complete the user's profile is in general, and whether this user has a standardized profile section.

One or more transformations may be performed in the features, such as performing histogram-like bucketing of the data into quartile buckets. If the user falls into the bucket, then the feature value is 1, otherwise 0. Crossing with edited profile field may also be performed, where each feature is member-oriented and hence to incorporate the feature as to whether a profile field was ever edited, obtained from the histogram-like bucketing, it is crossed with the main profile fields desired for the corresponding context.

For each user u, f in training, assuming u edited f on D

Let $\delta_{u,f}^{Liquidity}$=Liquidity($u,D+3,D+10$)−Liquidity($u,d-7,D$)

wherein Liquidity($u,\bullet,\bullet$) is an aggregate function (avg or sum) on the number of total recommendations for user u. The 2nd and 3rd arguments represent start and end date, respectively.

Let $\delta_{u,f}^{CTR}=CTR(u,D+3,D+10)-CTR(u,d-7,D)$

Let $y_{u,f}=0.5 \cdot \delta_{u,f}^{Liquidity}+0.5 \cdot \delta_{u,f}^{CTR}$.

As described above, logistic regression modeling can be used in the FVS model, where the response is 1 if the edit brings positive value and 0 if negative or zero value. To define positive value, the distribution of the change in a metric, such as People You May Know impressions or clients, can be plotted, and extreme outliers can be removed from training. Also small change qualities can be eliminated as they can be noisy (i.e., not a material change).

In an alternative embodiment, Poisson regression can be used with linear regression modeling by using raw count directly as responses.

It should be noted that while the aforementioned embodiments utilize pre-specified features for each machine learned model, in one example embodiment some or all of these features are learned via a machine learning algorithm used to train the corresponding machine learned model, in supervised feature learning, features may be learned in part with labeled input data using, for example, supervised neural networks, multilayer perceptron, and supervised dictionary learning. In unsupervised feature learning, features may be learned with unlabeled input data using, for example, dictionary learning, independent component analysis, autoencoders, matrix factorization, and various forms of clustering.

In an example embodiment, both the second and third machine learned models 404, 408 are logistic regression models.

As described briefly above, the model result combiner 412 combines the outputs of the second machine learned model 404 and third machine learned model 408. In an example embodiment, the result may be a score known as an edit value assigned to each field missing from the user's profile. Specifically, for each user u and profile field f missing from u's profile, the edit value may be computed as follows:

EditValue(u,f)=FVS(u,f)*PoE(u,f)

where FVS is a field value score reflecting the output of the second machine learned model 404 estimating the expected value a member can gain through adding the missing field f, PoE stands for Probability of Editing, which indicates the propensity the user u is to edit field f of the profile.

Given a user u (and implicitly the user u's profile) and a profile field f, FVS(u, f) outputs the expected incremental gain u can achieve by adding f, in the current context. In the People You May Know context, this may be computed as a combination of the excepted change in liquidity (i.e., the number of recommendations pushed, or the number of impressions seen) and the expected change in quality (i.e., score increase in top-K, or click-through-rate (CTR) increase). Note that this change can be positive or negative, and thus response variables can be defined properly to address this nature. In an alternative embodiment, multiple single-objective models can be used, one using liquidity and the other using CTR as the response.

Figure 5:
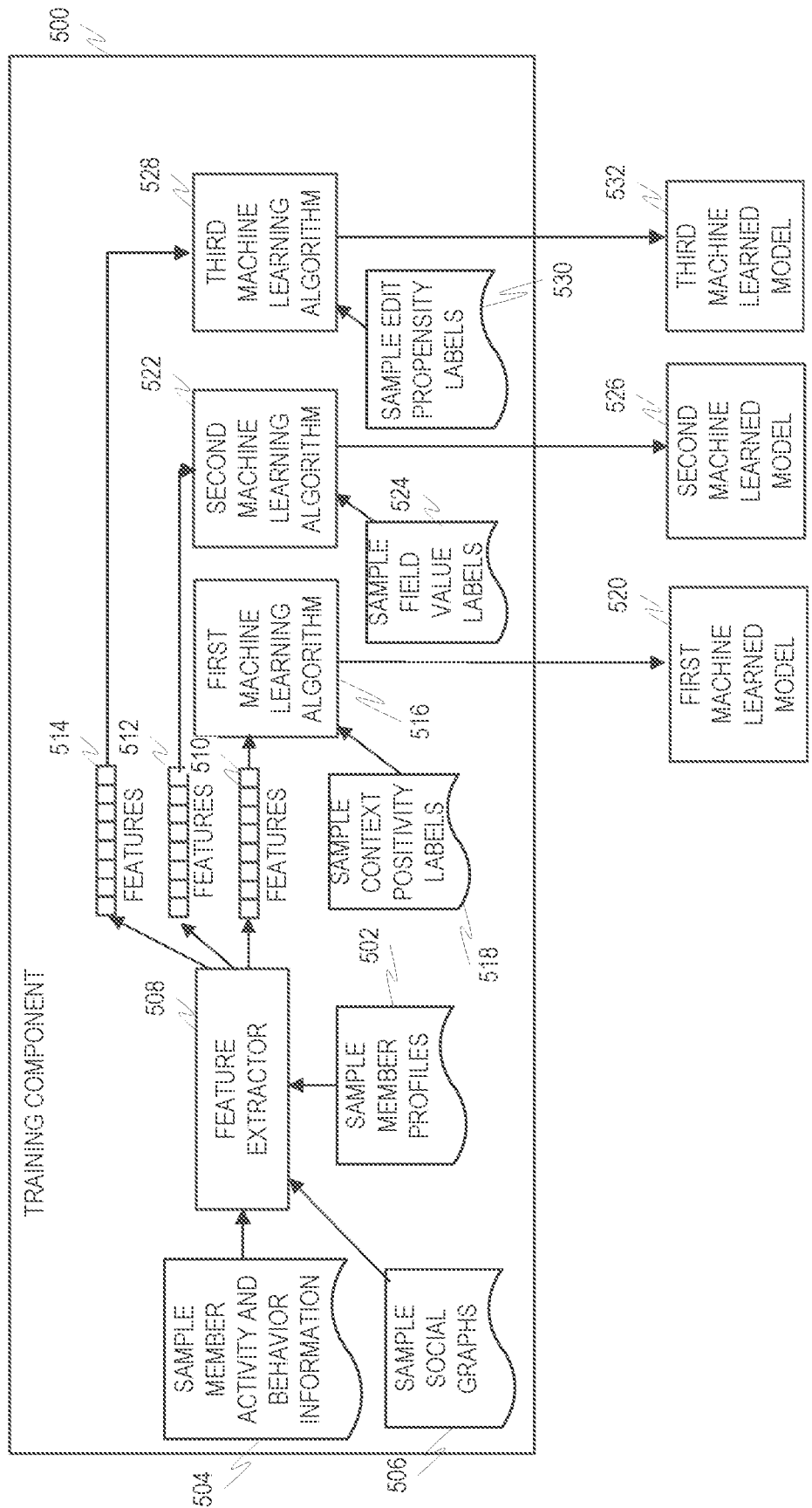
FIG. 5 is a block diagram illustrating training of machine learned models in a contextual profile data requester in accordance with an example embodiment.

FIG. 5 is a block diagram illustrating training of machine learned models in a contextual profile data requester 310 in accordance with an example embodiment. In a training component 500, sample member profiles 502, sample member activity and behavior information 504, and and/or sample social graphs 506 are fed to a feature extractor 508, which acts to extract curated features 510-514 from the sample member profiles 502, sample member activity and behavior information 504, and and/or sample social graphs 506. Different features 510-514 may be extracted depending upon the context.

In an example embodiment, the curated features 510 are then used as input to a first machine learning, algorithm 516 to train, with sample context positivity labels 518 (if a supervised machine learning algorithm is used), a first machine learned model 520 to generate an indication as to whether or not the user's contextual experience was positive.

In an example embodiment, the curated features 512 are then used as input to a second machine learning algorithm 522 to train, with sample field value labels 524 (if a supervised machine learning algorithm is used), a second machine learned model 525 to generate an indication as to the value of a missing field value in a member profile.

In an example embodiment, the curated features 514 are then used as input to a third machine learning algorithm 528 to train, with sample edit propensity labels 530 (if a supervised machine learning algorithm is used), a third machine learned model 532 to generate an indication as to the user's likelihood to edit a field in the user's profile if prompted.

In an example embodiment, all of the information retrieved from the sample member profiles 502, sample member activity and behavior information 504, and sample social graphs 506, and used to generate features 512 for use with the second machine learning algorithm 522, may be selected only from certain member cohorts. In one example embodiment, this may include only cohorts with members who have made at least one profile edit within the last fixed period of time (e.g., 30 days). For each edit, the day of edit D may be determined. From tracking data, various metrics such as impressions, invitations, and click through rate may be obtained for two different time intervals around the day of edit D, such as one interval being within a week before D and the other interval being within a week after D. The delta between these two intervals may be computed and transformed if necessary.

Figure 6:
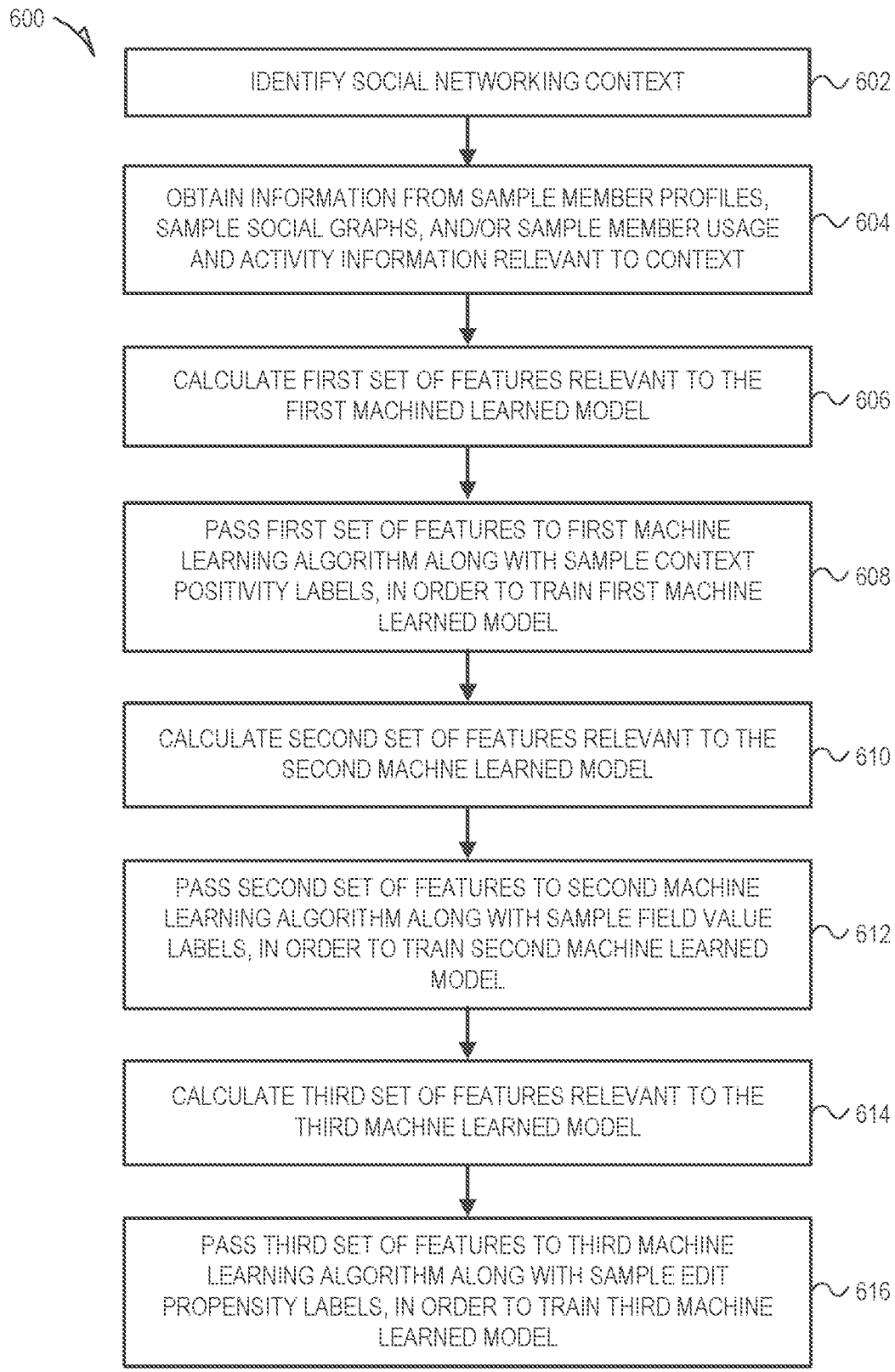
FIG. 6 is a flow diagram illustrating a method of training a first, second, and third machine learned model in accordance with an example embodiment.

FIG. 6 is a flow diagram illustrating a method 600 of training a first, second, and third machine learned model in accordance with an example embodiment. It should be noted that this method 600 may be modified for embodiments where only one or two machine learned models are trained by eliminating some of the operations.

At operation 602, a social networking service context is identified. The context indicates a portion of the service in which certain results are presented to a user, such as a People You May Know section, feed section, and job results section. At operation 504, information from sample member profiles, sample social graphs, and/or sample member usage and activity information relevant to the context is obtained. At operation 605, a first set of features relevant to the first machine learned model is calculated from the information obtained in operation 604. At operation 603, the first set of features is passed to a first machine learning algorithm along with sample context positivity labels in order to train the first machine learned model.

At operation 610, a second set of features relevant to the second machine learned model is calculated from the information obtained in operation 604. At operation 612, the second set of features is passed to a second machine learning algorithm along with sample field value labels in order to train the second machine learned model.

At operation 614, a third set of features relevant to the third machine learned model is calculated from the information obtained in operation 604. At operation 616, the third set of features is passed to a third machine learning algorithm along with sample edit propensity labels in order to train the third machine learned model.

Figure 7:
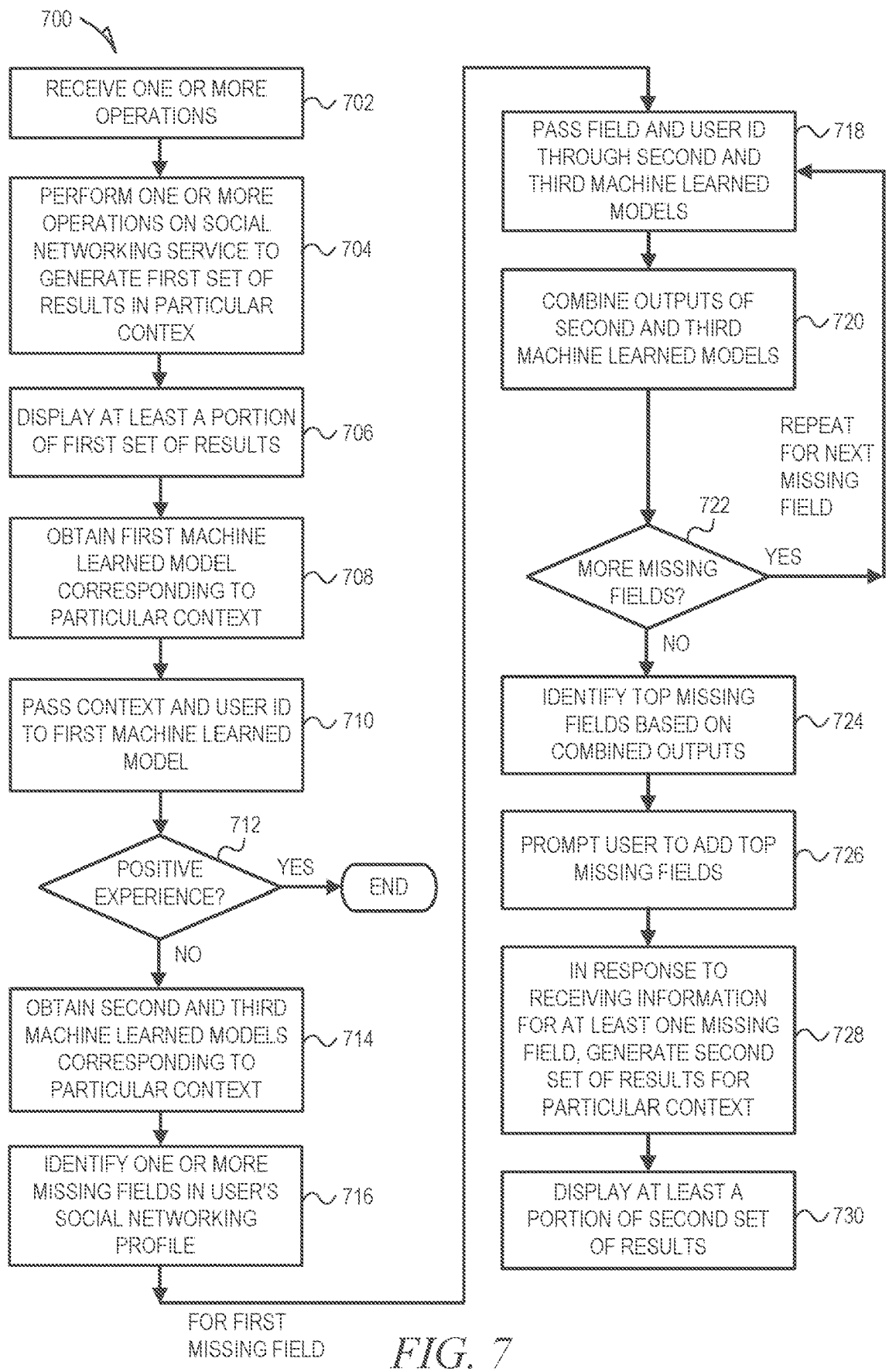
FIG. 7 is a flow diagram illustrating a method for eliciting an edit to a social networking profile in accordance with an example embodiment.

FIG. 7 is a flow diagram illustrating a method 700 for eliciting an edit to a social networking profile in accordance with an example embodiment. At operation 702, one or more operations initiated by a user are received via a user interface of a computer system. At operation 704, the one or more operations are performed on a social networking service to generate a first set of one or more results in a particular context of the social networking service. At operation 706, at least a portion of the first set of one or more results is displayed to the user via the user interface.

At operation 708, a first machine learned model corresponding to the particular context is obtained, the first machine learned model trained via a first machine learning algorithm to output an indication of whether the user is having a positive experience with the first set of one or more results for the particular context. At operation 710, the context and an identification of the user are passed to the first machine learned model to output an indication of whether or not the user is having a positive experience with the first set of one or more results for the particular context.

At operation 712, it is determined if the user is having a positive experience with the first set of one or more results for the particular context. If so, then the method 700 may end. If not, then at operation 714 a second and third machine learned model corresponding to the particular context are obtained, the second machine learned model trained via a second machine learning algorithm to output an indication of the importance of a social networking profile field to obtaining results in the particular context, and the third machine learned model trained via a third machine learning algorithm to output a propensity of the user to edit a social networking profile field if requested.

At operation 716, one or more missing fields in a social networking profile for the user are identified. A loop is then begun for each of one or more of the one or more missing fields. At operation 718, the field and the identification of the user are passed through the second and third machine learned models. At operation 720, the outputs of the first and second machine learned model are combined. At operation 722, it is determined if there are any more missing, fields. If so, then the method 700 loops back to operation 718 for the next missing field. If not, then at operation 724 one or more top missing profile fields are identified based on the combined output for each of the one or more missing fields.

At operation 726, the user is prompted to add information for the identified one or more top missing profile fields. At operation 728, in response to receiving information for at least one of the identified one or more top missing profile fields, a second set of one or more results is generated in the particular context. At operation 730, at least a portion of the second set of one or more results is displayed to the user via the user interface.

Figure 8:
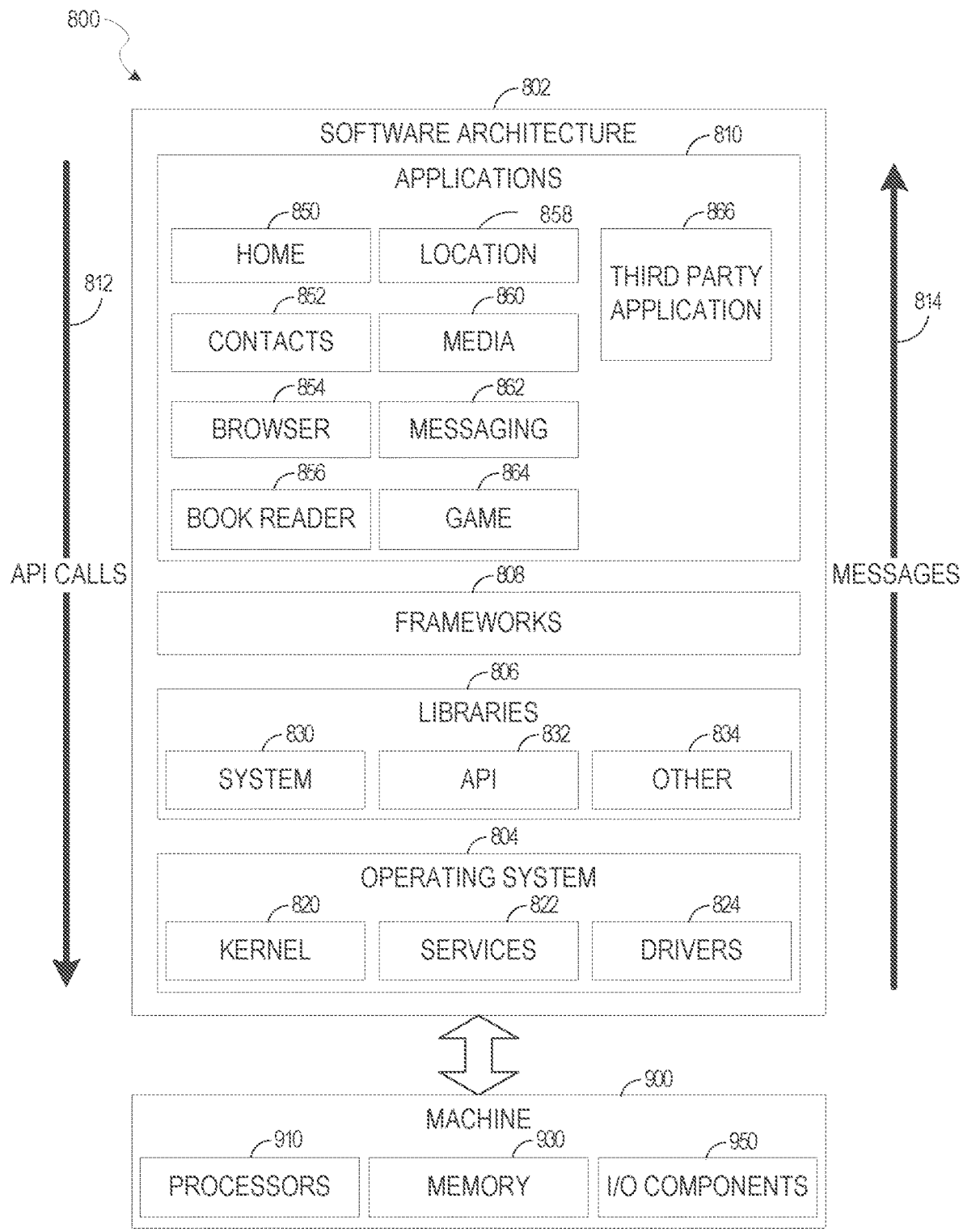
FIG. 8 is a block diagram illustrating an architecture of software, which can be installed on any one or more of the devices described above.

FIG. 8 is a block diagram 800 illustrating an architecture of software 802, which can be installed on any one or more of the devices described above. FIG. 8 is merely a non-limiting example of a software architecture, and it will be appreciated that many other architectures can be implemented to facilitate the functionality described herein. In various embodiments, the software 802 is implemented by hardware such as a machine 900 of FIG. 9 that includes processors 910, memory 930, and I/O components 950. In this example architecture, the software 802 can be conceptualized as a stack of layers where each layer may provide a particular functionality. For example, the software 802 includes layers such as an operating system 804, libraries 806, frameworks 808, and applications 810. Operationally, the applications 810 invoke application programming interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphic, user interface (GUI) functions, high-level resource management, high-level location services, and so forth. The frameworks 808 can provide a broad spectrum of other APIs that can be utilized by the applications 810, some of which may be specific to a particular operating system or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
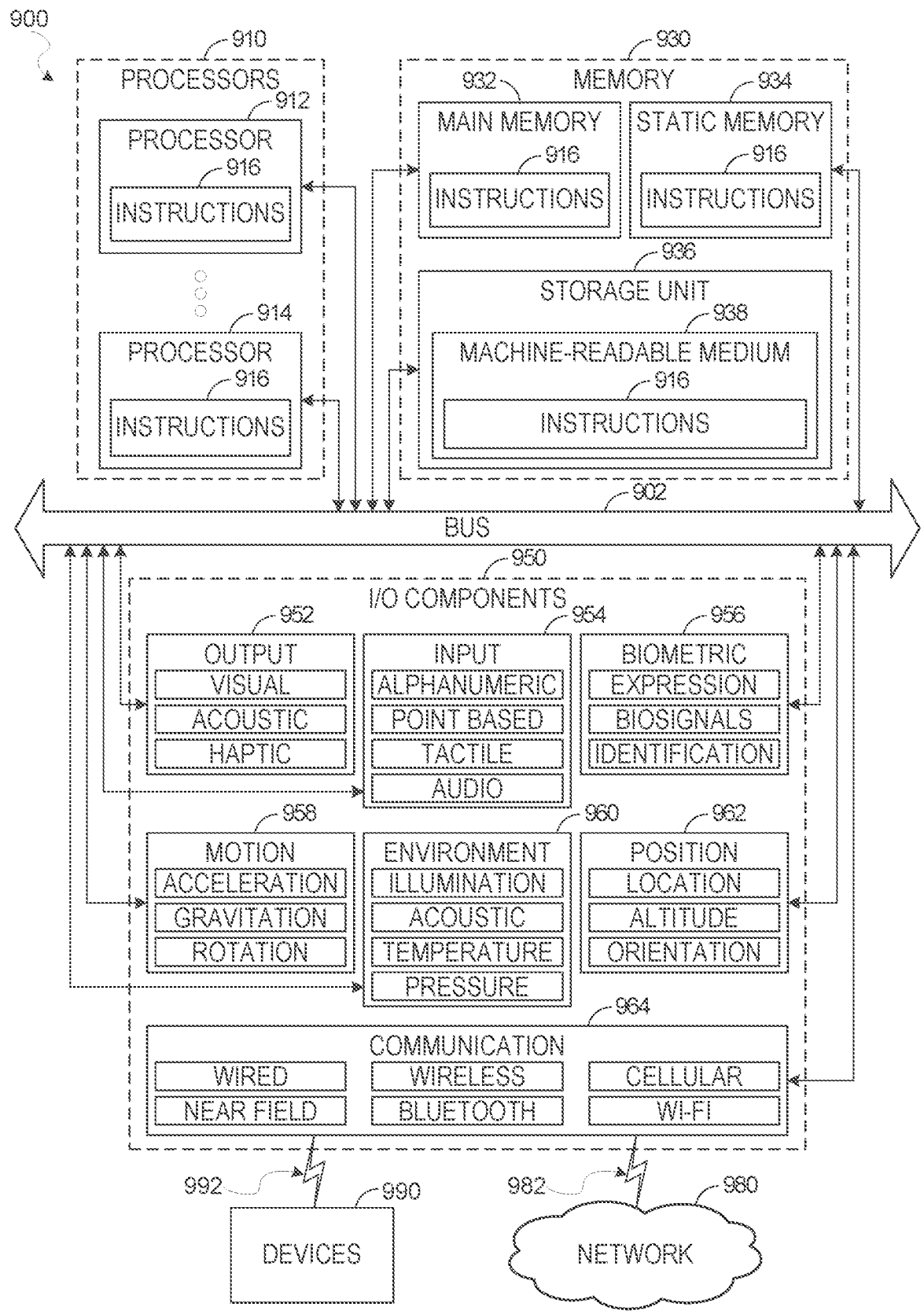
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute the method 700 of FIG. 7. Additionally, or alternatively, the instructions 916 may implement FIGS. 1-7, and so forth. The instructions 916 transform the general, non-programmed machine 900 into a particular machine 900 programmed to carry out the described and illustrated functions in the manner described. In alternative embodiments, the machine 900 operates as a standalone device or may be coupled networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936, both accessible to the processors 910 such as via the bus 902. The main memory 930, the static memory 934, and storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 990 via a coupling 982 and a coupling 992, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 930, 932, 934, and/or memory of the processor(s) 910) and/or storage unit 936 may store one or more sets of instructions and data structures (e.g., software) embodying or utilized by any one or more of the methodologies or functions described herein. These instructions (e.g., the instructions 916), when executed by processor(s) 910, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, as extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 992 (e.g., a peer-to-peer coupling) to the devices 990. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
a non-transitory computer-readable medium having instructions stored thereon, which, when executed by a processor, cause the system to:
train a first machine learned model, by extracting a first set of features from a plurality of sample member profiles and passing the first set of features along with sample field value labels, to output an indication of importance for a member profile field;
train a second machine learned model, by extracting a second set of features from a plurality of sample member profiles and sample member activity and behavior information and passing the second set of features along with sample edit propensity labels, to output a propensity of users to edit the member profile field if requested, the training of the second machine learned model performed independently of the training of the first machine learned model;
receive, via a user interface of a computer system, one or more operations initiated by a user;
perform the one or more operations on a social networking service to generate a first set of one or more results in a particular context of the social networking service, the particular context based on the one or more operations;
display at least a portion of the first set of the one or more results to the user via the user interface;
identify one or more missing fields in a social networking profile for the user;
for each of one or more of the one or more missing fields, pass the field and an identification of the user through the first machine learned model, producing a first probability as output pass the field and the identification of the user through the second machine learned model, producing a second probability as output and combine the first and second probabilities outputs of the first and second machine learned models;
identify one or more top missing profile fields based on the combined probabilities for each of the one or more missing fields;
prompt the user to add information for the identified one or more top missing profile fields;
in response to receiving information for at least one of the identified one or more top missing profile fields, generate a second set of one or more results in the particular context; and
display at least a portion of the first set of the one or more results to the user via the user interface.

2. The system of claim 1, wherein the first machine learning algorithm is a logistic regression algorithm.

3. The system of claim 1, wherein the second machine learning algorithm is a logistic regression algorithm.

4. The system of claim 1, wherein the first set of features is further extracted from sample social graph and sample member usage and activity information.

5. The system of claim 4, wherein the first feature data includes member network size and member tenure on the social networking service.

6. The system of claim 5, wherein the first feature data further includes member recent feed, job search, and messaging activity level and member social network profile completion information.

7. The system of claim 1, wherein the instructions further cause the system to:
obtain a third machine learned model corresponding to the particular context, the third machine learned model trained via a third machine learning algorithm to output an indication of whether the user is having a positive experience with the first set of the one or more results for the particular context.

8. A computerized method comprising:
training a first machine learned model, by extracting a first set of features from a plurality of sample member profiles and passing the first set of features along with sample field value labels, to output an indication of importance for a member profile field;
training a second machine learned model, by extracting a second set of features from a plurality of sample member profiles and sample member activity and behavior information and passing the second set of features along with sample edit propensity labels, to output a propensity of users to edit the member profile field if requested, the training of the second machine learned model performed independently of the training of the first machine learned model;
receive, via a user interface of a computer system, one or more operations initiated by a user;
performing the one or more operations on a social networking service to generate a first set of one or more results in a particular context of the social networking service, the particular context based on the one or more operations;
displaying at least a portion of the first set of the one or more results to the user via the user interface;
identifying one or more missing fields in a social networking profile for the user; for each of one or more of the one or more missing fields, pass the field and an identification of the user through the first machine learned model, producing a first probability as output, pass the field and the identification of the user through the second machine learned model, producing a second probability as output and combine the first and second probabilities;
identifying one or more top missing profile fields based on the combined probabilities for each of the one or more missing fields;
prompting the user to add information for the identified one or more top missing profile fields;
in response to receiving information for at least one of the identified one or more top missing profile fields, generating a second set of one or more results in the particular context; and
displaying at least a portion of the first set of the one or more results to the user via the user interface.

9. The computerized method of claim 8, wherein the first machine learning algorithm is a logistic regression algorithm.

10. The computerized method of claim 8, wherein the second machine learning algorithm is a logistic regression algorithm.

11. The computerized method of claim 8, wherein the first set of features is further extracted from sample social graph and sample member usage and activity information.

12. The computerized method of claim 11, wherein the first feature data includes member network size and member tenure on the social networking service.

13. The computerized method of claim 12, wherein the first feature data further includes member recent feed, job search, and messaging activity level and member social network profile completion information.

14. The computerized method of claim 8, further comprising:
obtaining a third machine learned model corresponding to the particular context, the third machine learned model trained via a third machine learning algorithm to output an indication of whether the user is having a positive experience with the first set of the one or more results for the particular context.

15. A non-transitory machine storage medium comprising instructions, which when implemented by one or more machines, cause the one or more machines to perform operations comprising:
training a first machine learned model, by extracting a first set of features from a plurality of sample member profiles and passing the first set of features along with sample field value labels, to output an indication of importance for a member profile field;
training a second machine learned model, by extracting a second set of features from a plurality of sample member profiles and sample member activity and behavior information and passing the second set of features along with sample edit propensity labels, to output a propensity of users to edit the member profile field if requested, the training of the second machine learned model performed independently of the training of the first machine learned model;
receiving, via a user interface of a computer system, one or more operations initiated by a user;
performing the one or more operations on a social networking service to generate a first set of one or more results in a particular context of the social networking service, the particular context based on the one or more operations;
displaying at least a portion of the first set of the one or more results to the user via the user interface;
identifying one or more missing fields in a social networking profile for the user;
for each of one or more of the one or more missing fields, pass the field and an identification of the user through the first machine learned model, producing a first probability as output pass the field and the identification of the user through the second machine learned model, producing a second probability as output and combine the first and second probabilities;
identifying one or more top missing profile fields based on the combined probabilities for each of the one or more missing fields;
prompting the user to add information for the identified one or more top missing profile fields;
in response to receiving information for at least one of the identified one or more top missing profile fields, generating a second set of one or more results in the particular context; and
displaying at least a portion of the first set of the one or more results to the user via the user interface.

16. The non-transitory machine storage medium of claim 15, wherein the first machine learning algorithm is a logistic regression algorithm.

17. The non-transitory machine readable storage medium of claim 15, wherein the second machine learning algorithm is a logistic regression algorithm.

18. The non-transitory machine storage medium of claim 15, wherein the first set of features is further extracted from sample social graph and sample member usage and activity information.

19. The non-transitory machine storage medium of claim 18, wherein the first feature data includes member network size and member tenure on the social networking service.

20. The non-transitory machine storage medium of claim 19, wherein the first feature data further includes member recent feed, job search, and messaging activity level and member social network profile completion information.

* * * * *